S. SIEGEL.
MUSICAL EDUCATIONAL CHART.
APPLICATION FILED MAR. 11, 1915.

1,309,915.

Patented July 15, 1919.
2 SHEETS—SHEET 1.

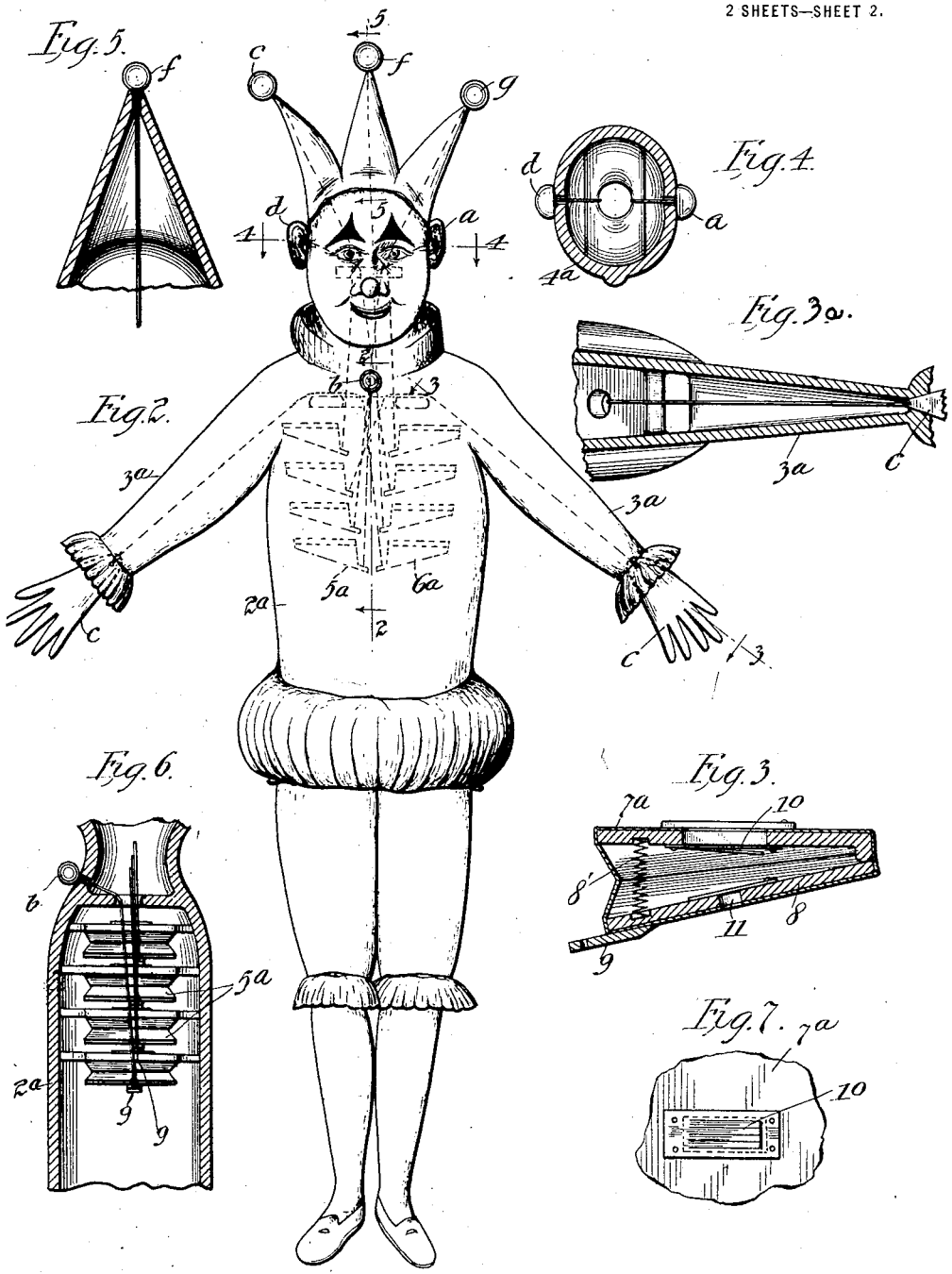

UNITED STATES PATENT OFFICE.

SAMUEL SIEGEL, OF CHICAGO, ILLINOIS, ASSIGNOR TO ANNA SIEGEL, OF CHICAGO, ILLINOIS.

MUSICAL EDUCATIONAL CHART.

1,309,915.      Specification of Letters Patent.      Patented July 15, 1919.

Application filed March 11, 1915. Serial No. 13,722.

*To all whom it may concern:*

Be it known that I, SAMUEL SIEGEL, a citizen of the United States, residing at Chicago, in the county of Cook and State of Illinois, have invented new and useful Improvements in Musical Educational Charts, of which the following is a full, clear, and exact description.

My invention relates to means for teaching music, and particularly to printed matter or charts for this purpose.

Modern methods of teaching children have demonstrated that they learn quicker by being amused and interested in things they can see and hear, and particularly those things that arouse and bring their imaginative faculties into play. The object of my invention is to teach music to the child by familiarizing it first with pictures of common animated objects; then the parts of said objects and then pictorial means for indicating some one of said parts, and then teaching the child to perform some simple function with the part of a physical replica or toy of the animated object so illustrated in order to produce the notes of the common or other scale either in succession or in such manner as to produce a simple melody. The doing of these simple acts soon educates the ear of the child and trains the hand and it acquires the ability to concentrate its mental faculties on such matters as may be brought to its attention much sooner than it otherwise would. This I accomplish by the means hereinafter fully described, and as particularly pointed out in the claims.

In the drawings:

Fig. 2 is a diagrammatical view of a musical toy, illustrated in the pictures displayed in said chart.

Fig. 3 is a sectional view of one of the pneumatics used in said toy.

Figure 1:
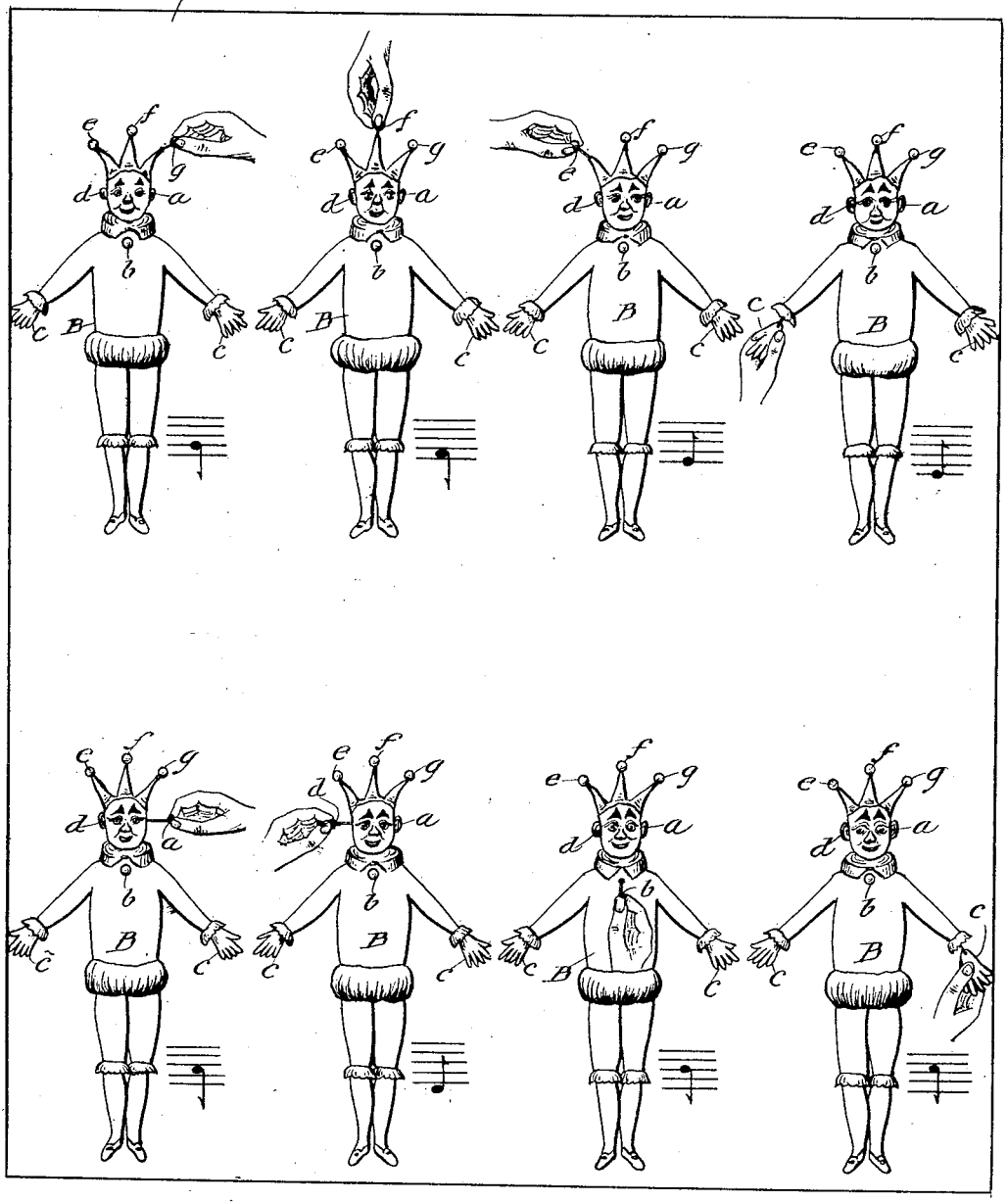
Figure 1 is a plan view of a chart embodying my invention.

Fig. 3$^a$ is a section taken on dotted line 3—3, Fig. 2, through the arm portion of said toy.

Fig. 4 is a horizontal section of the head of said toy taken on dotted line 4—4, Fig. 2.

Fig. 5 is a vertical section of the same taken on dotted line 5—5, Fig. 2, drawn to a larger scale.

Fig. 6 is a vertical section of a portion of the body of the toy taken on dotted line 6—6, Fig. 2.

Fig. 7 is a plan view of the reed attached to a fragment of the upper leaf of one of the pneumatics shown in Fig. 3 of the drawings.

Referring to the drawings, A represents a chart having, preferably, eight or more corresponding pictures of an animate object, which, in the drawings are shown to be arranged in two horizontal rows. The animate object, illustrated by the picture, is a front view of a clown, which is shown in standing position with its arms $3^a$ held out from its body and its hands $c$ open. The ears $a$, $d$ of the clown stand out from its head, and upon the latter a cap is placed having three peaks $e$, $f$ and $g$, each with a button or ball on its extremity. Just below the chin of the clown it has a scarf-pin $b$.

These pictures all represent a toy clown, which is shown in Fig. 2 of the drawings. The torso or body $2^a$ of this toy is made hollow, and the legs are suitably secured in proper position thereto. The upper part of the body is provided with hollow arms $3^a$, $3^a$, and a hollow head $4^a$ extends upward therefrom midway between the arms. The body $2^a$, arms $3^a$ and head $4^a$ constitute the shell or casing of an interior chamber or branches thereof, and within the hollow body, eight small bellows are placed that are arranged in two vertical tiers $5^a$ and $6^a$. The stationary leaf $7^a$ of each bellows is uppermost and secured to the shell of body $2^a$ in any suitable manner, and the movable leaf 8, which is forced away from the same by a coil spring 8' is hinged to the edge of said stationary leaf nearest the side of the body and has its opposite edge nearest the center of said body provided with a longitudinally disposed finger 9 that projects a slight distance beyond the same. These bellows are each provided with a suitable reed 10, preferably, in the stationary leaf, and the movable leaf of each bellows is provided with a valve-controlled air-hole 11. There is nothing new in the construction of these bellows, and they are constructed to produce different tones, preferably, to produce the musical notes of the common major scale; $c$, $d$, $e$, $f$, $g$, $a$, $b$ and $c$.

The hands $c$, $c$, at the ends of the hollow arms are provided with wrists that fit into and close the open ends thereof, and the inner extremities of these wrists are connected by cords to fingers 9 of the movable leaves of certain bellows of each tier. The hands c, c, can be pulled out from the ends of the arms a slight distance, and when the right hand is pulled it produces the musical note known as low c, and when the left hand is pulled it produces the musical note high c.

Ears a, d, are fitted over openings in the sides of the head of the toy clown and are, respectively, connected by cords to fingers 9 of certain bellows in each tier. Thus when the right ear is pulled the musical note "d" may be produced by the bellows to which it is connected, or when the left ear is pulled the note "a" may be produced.

The ends of each peak e, f and g terminate in a button and the buttons of the side peaks e and g are connected by cords to certain other of said bellows, as likewise is the button of the central peak, and when the right-hand button is pulled musical note "e" is sounded, when the central button is pulled note "f" is sounded, and when the left hand button is pulled note "g" is sounded. Scarf-pin b is placed over a hole in the body of the toy clown, and it is connected by a cord to the remaining one of said bellows, and when this scarfpin is pulled it produces the musical note "b."

Thus, if the right hand is pulled, then the right ear, then the button on the right peak, then the central button, then the left button, then the left ear, then the scarf-pin and then the left hand, the common musical scale will be produced, or if these are manipulated in proper order, a simple melody can be produced.

The pictures of this same toy clown each have a hand index k which points to one of the movable parts of the toy clown which it is desired to have the child operator pull. By reading the chart in this manner and obeying the instructions contained therein, the musical toy can be made to play a simple air. This simple method of instruction and amusement is very easily understood and arouses a keen interest in the child that insures the concentration of its mental faculties in what it is doing and furnishes exercises as it were of both its musical and intellectual abilities.

What I claim as new is:

1. A music chart for use with a sound producing manikin having movable parts for producing different tones of an octave, comprising a series of pictures of the manikin with the representations of the movable parts thereof illustrated in the pictures with the desired movable parts shown in operative positions in the pictures for indicating the desired series of tones to be produced, the chart also having illustrated thereon tone indicating data located relatively to the corresponding moved parts in the pictures.

2. A music chart for use with a sound producing manikin having movable parts for producing different tones of an octave, comprising a series of pictures of the manikin with the representations of the movable parts thereof illustrated in the pictures with the desired movable parts shown in operative positions in the pictures for indicating the desired series of tones to be produced, the chart also having illustrated thereon tone indicating data opposite each movable part and a fragment of a staff in each picture, the staff in each picture having a note corresponding to the illustrated moved part in said picture.

In witness whereof I have hereunto set my hand this 3d day of March, 1915.

SAMUEL SIEGEL.

Witness:
FLORENCE MITCHELL.